536-56. XR T867028 SR CROSS REFERENCE SEARCH ROOM

T867,028

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1095

835,251

PROCESS FOR MAKING ALKALI CELLULOSE

Donald A. Sharman, "Conifers" 99A Kelsey Lane, Balsall Common, near Coventry, Warwickshire, England

Filed June 20, 1969. Published Oct. 28, 1969
Claims priority, application Great Britain, June 20, 1968, 29,351/68
Int. Cl. D21c *3/02*
U.S. Cl. 162—90
No Drawing. 4 Pages Specification

TX160:

A process for making solid alkali cellulose comprising mixing and steeping wood pulp with an aqueous caustic soda solution to form a slurry, passing the slurry to a slurry press and then pressing the slurry to form solid alkali cellulose, and including the step of injecting live steam into the slurry as it is being passed to the slurry press so as to raise its temperature. The mixing and steeping operation may be carried out at a temperature of about 45° C. and the pressing operation at a temperature of about 55° C.